(12) United States Patent
Torii et al.

(10) Patent No.: US 7,378,774 B2
(45) Date of Patent: May 27, 2008

(54) LAMINATED CORE OF ROTARY ELECTRIC MACHINE

(75) Inventors: Atsushi Torii, Nishio (JP); Masafumi Sakuma, Chiryu (JP); Akinori Hoshino, Nisshin (JP); Hiroyuki Yamamoto, Anjo (JP)

(73) Assignee: Aisin Seiki Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 11/509,758

(22) Filed: Aug. 25, 2006

(65) Prior Publication Data

US 2007/0046125 A1 Mar. 1, 2007

(30) Foreign Application Priority Data

Aug. 30, 2005 (JP) ............................. 2005-249989

(51) Int. Cl.
*H02K 1/14* (2006.01)
*H02K 1/18* (2006.01)
*H02K 1/27* (2006.01)

(52) U.S. Cl. .................... 310/216; 310/217; 310/218; 310/156.53; 310/156.56; 336/233; 336/234

(58) Field of Classification Search ........ 310/216–218, 310/156.53, 156.56
See application file for complete search history.

(56) References Cited

U.S. PATENT DOCUMENTS 4,365,180 A * 12/1982 Licata et al. ................ 310/216
4,613,780 A * 9/1986 Fritzsche .................... 310/216
4,990,809 A * 2/1991 Artus et al. ................. 310/192
5,831,366 A * 11/1998 Kern et al. .................. 310/216
5,986,377 A * 11/1999 Yamada et al. ............. 310/216
6,121,711 A * 9/2000 Nakahara et al. ........... 310/254
6,369,687 B1 * 4/2002 Akita et al. ................. 336/234
6,634,080 B2   10/2003 Bareis et al.
6,661,147 B2 * 12/2003 Tajima et al. ............... 310/216
6,919,665 B2 * 7/2005 Murakami et al. .......... 310/216
2003/0127938 A1 * 7/2003 Shen et al. .................. 310/216
2004/0061413 A1 * 4/2004 Miyake et al. .............. 310/259
2005/0073211 A1 * 4/2005 Lee ............................. 310/216
2005/0258700 A1 * 11/2005 Fratta ......................... 310/162

FOREIGN PATENT DOCUMENTS

JP         11234928 A  *  8/1999
JP       2001-152528 A     5/2000

(Continued)

*Primary Examiner*—Tran Nguyen
(74) *Attorney, Agent, or Firm*—Sughrue Mion, PLLC (57) ABSTRACT

A laminated core having a first number of magnetic poles, the first number being a natural number divided by two, of a rotary electric machine, includes a plurality of arc-shaped unit cores each having a second number of magnetic poles, the second number being a natural number except for an aliquot part of the first number. The unit cores are wound and laminated a predetermined number of times in a circumferential direction into a spiral shape in such a manner that an axial lamination amount of the unit cores is obtained by an equation of $X=\theta*t/360$, X being the axial lamination amount, $\theta$ being a winding angle of the unit cores, and t being a thickness of the unit core. The unit cores are adjacent to each other in the circumferential direction connected to each other at a part of an outer circumference thereof.

21 Claims, 4 Drawing Sheets

FOREIGN PATENT DOCUMENTS

| | | | |
|---|---|---|---|
| JP | 2002-262496 A | | 9/2002 |
| JP | 2002262496 A | * | 9/2002 |
| JP | 2003-528557 A | | 9/2003 |
| JP | 2003284268 A | * | 10/2003 |
| JP | 2006345636 A | * | 12/2006 |

* cited by examiner

LAMINATED CORE OF ROTARY ELECTRIC MACHINE

CROSS REFERENCE TO RELATED APPLICATIONS

This application is based on and claims priority under 35 U.S.C. §119 to Japanese Patent Application No. 2005-249989, filed on Aug. 30, 2005, the entire content of which is incorporated herein by reference.

FIELD OF THE INVENTION

This invention generally relates to a laminated core for a rotary electric machine such as an electric generator and an electric motor.

BACKGROUND

A known laminated core is disclosed in JP2003-528557A and JP2002-262496A. That is, a motor stator core formed by laminating multiple sheet parts, each of which is shaped as an arc, in a zigzag manner as is disclosed in JP2003-528557A. More precisely, the sheet parts are arranged next to each other and joined with each other to form a laminated core. Substantially arc-shaped sheet part segments with a peripheral length corresponding to an angle α=360°/n, n being a whole positive number and greater than or equal to two, are produced by stamping. The 'n' numbers of these sheet part segments are then arranged in one plane to produce a sheet part, the sheet parts arranged next to each other being connected and/or welded with at least one connecting element.

JP2002-262496A discloses a core structure of a rotary electric machine. Recess and projection portions provided on end faces in the circumferential direction of each fan-shaped segmented core are fitted to each other to form an annular rotor core. Then, laminations of the predetermined number of annular rotor cores form a cylindrical rotor core. Each block of the cylindrical rotor cores forms laminations in a bricklaying manner by an arrangement of respective portions where the recess and projection portions are meted to each other in a staggered manner in the circumferential direction.

However, according to the aforementioned JP2003-528557A and JP2002-262496A, the arc-shaped sheet parts or the fan-shaped segmented cores are required to be arranged in the staggered manner with a predetermined angle in the circumferential direction. In addition, contacting portions between the arc-shaped sheet parts or those between the fan-shaped segmented cores are displaced in the circumferential direction among layers so that the rotor core is unified and prevented from separating off. Therefore, in doing so, laminating process of the arc-shaped sheet parts or the fan-shaped segmented cores is troublesome, and may cause an increase of a laminating time. As a result, a cost of manufacturing a motor may increase. Further, according to JP2002-262496A, a connecting process in an axial direction is required for a connection between the recess and projection portions provided on the end faces in the circumferential direction of each fan-shaped segmented core, thereby increasing the laminating process.

Thus, a need exists for a laminated core of a rotary electric machine in which a time for a laminating process can be reduced and a mechanically high strength can be obtained.

SUMMARY OF THE INVENTION

According to an aspect of the present invention, a laminated core having a first number of magnetic poles, the first number being a natural number divided by two, of a rotary electric machine includes a plurality of arc-shaped unit cores each having a second number of magnetic poles, the second number being a natural number except for an aliquot part of the first number. The unit cores are wound and laminated a predetermined number of times in a circumferential direction into a spiral shape in such a manner that an axial lamination amount of the unit cores is obtained by an equation of $X=\theta*t/360$, X being the axial lamination amount, θ being a winding angle of the unit cores, and t being a thickness of the unit core. The unit cores are adjacent to each other in the circumferential direction connected to each other at a part of an outer circumference thereof.

According to another aspect of the present invention, a laminated core having a first number of magnetic poles, the first number being a natural number divided by two, of a rotary electric machine includes a plurality of arc-shaped unit cores each having a second number of magnetic poles, the second number being a natural number except for an aliquot part of the first number. The unit cores are wound and laminated a predetermined number of times in a circumferential direction into a spiral shape in such a manner that an axial lamination amount of the unit cores is obtained by an equation of $X=\theta*t/360$, X being the axial lamination amount, θ being a winding angle of the unit cores, and t being a thickness of the unit core. The unit cores include through-holes into which sleeves are inserted respectively.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

An embodiment of the present invention will now be described with reference to the accompanying drawings.

Figure 1:
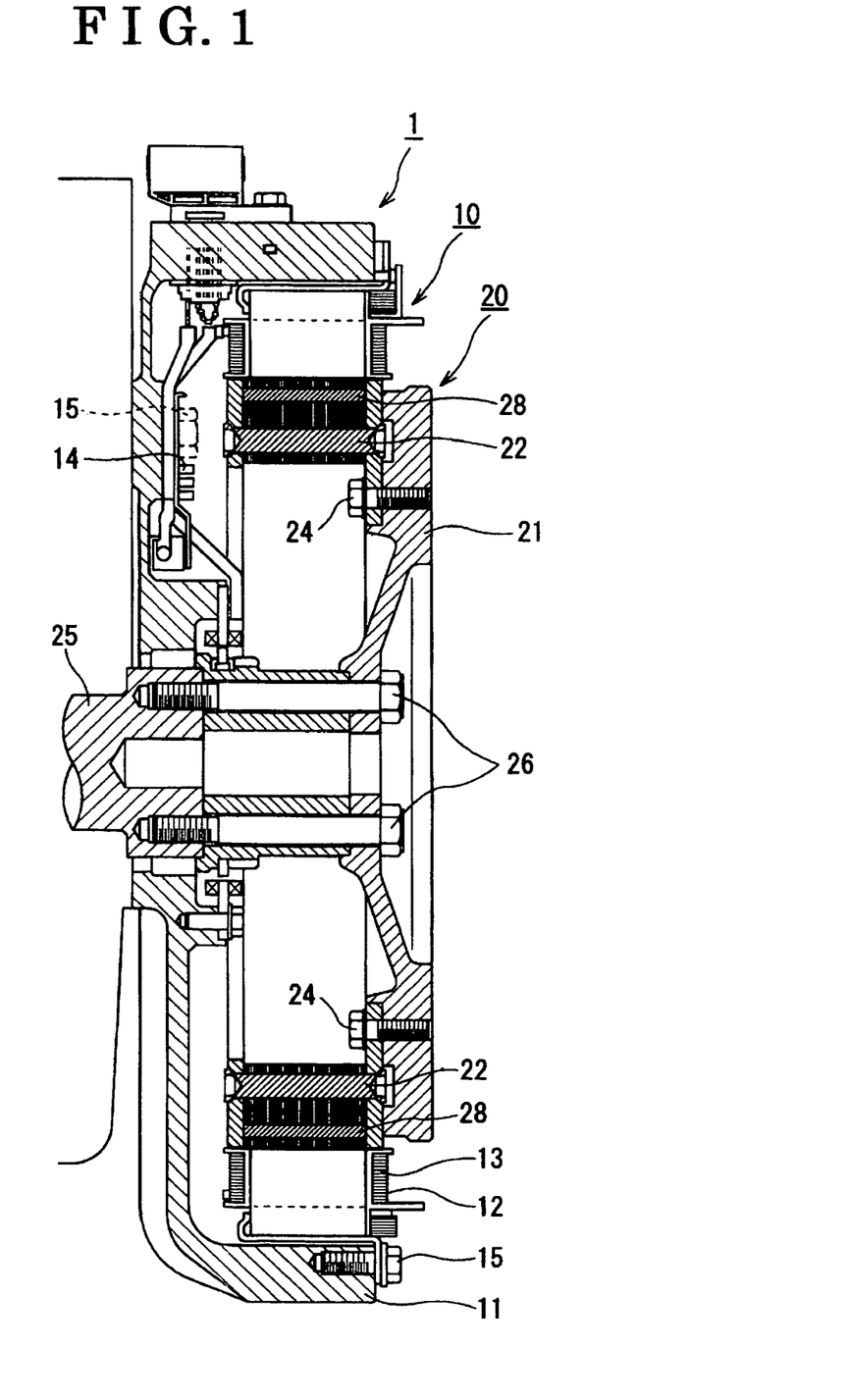
FIG. 1 is a cross-sectional view of an electric motor for which a laminated core of a rotor is used according to an embodiment of the present invention.
Figure 2:
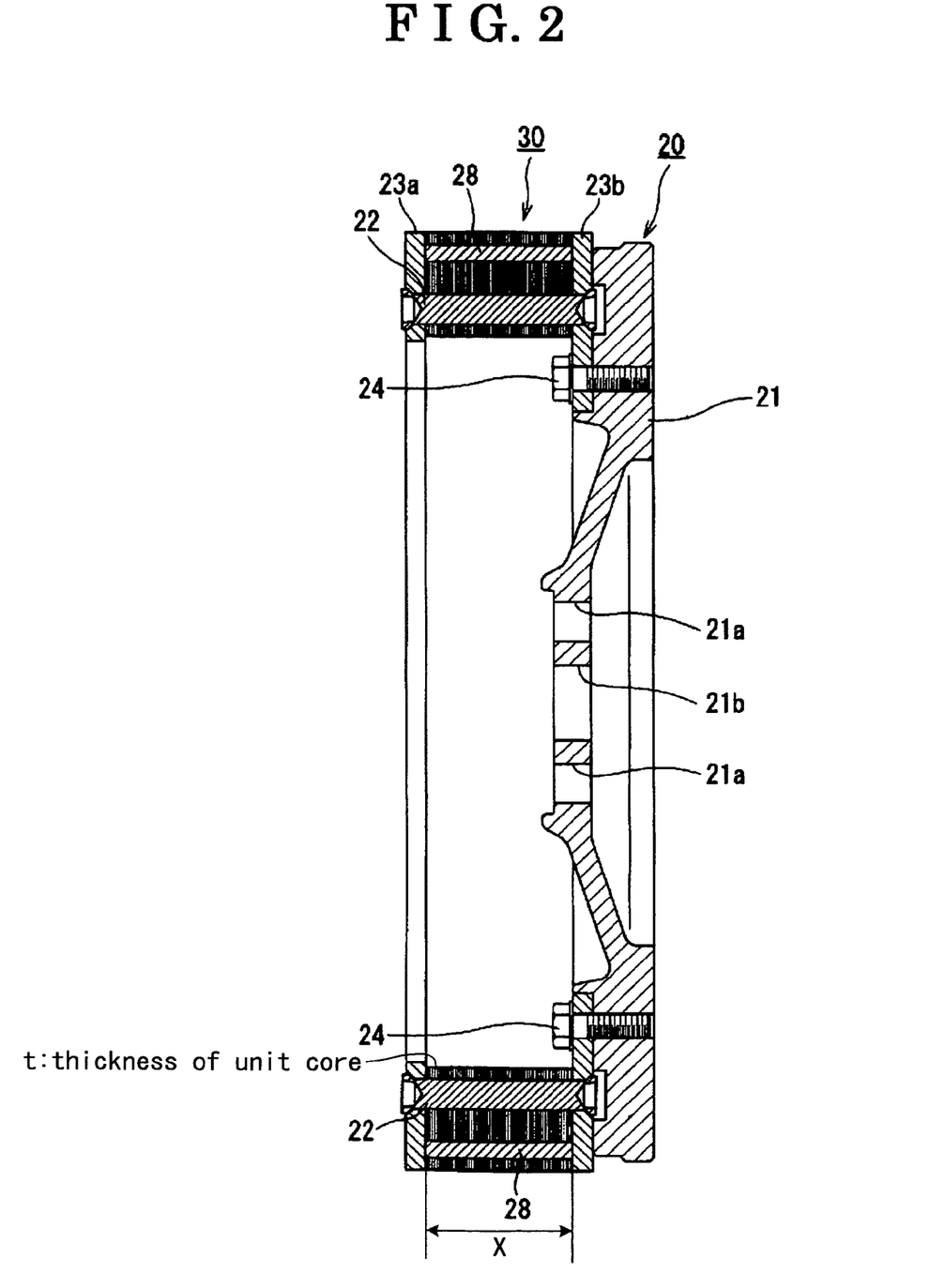
FIG. 2 is a cross-sectional view of the rotor illustrated in FIG. 1.
Figure 3:
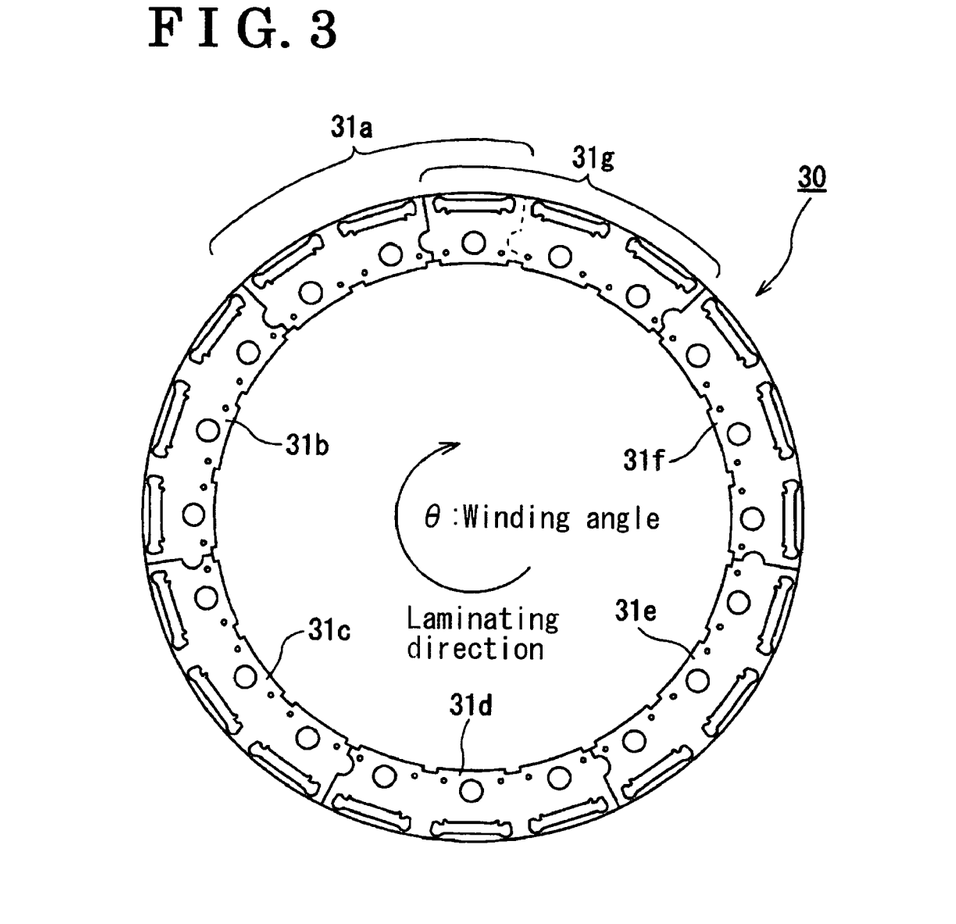
FIG. 3 is a front view of the laminated core of the rotor illustrated in FIG. 2.
Figure 4:
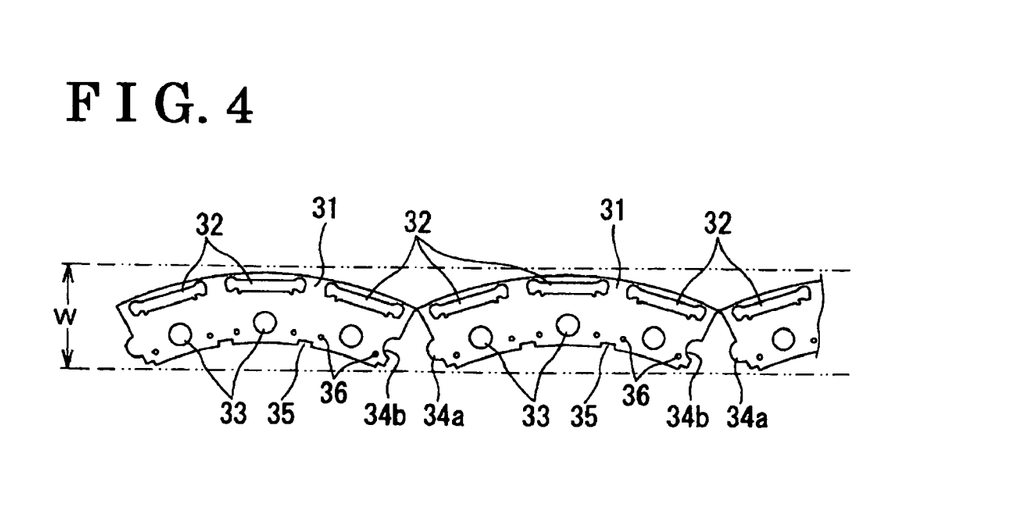
FIG. 4 is a front view of arc-shaped unit cores that constitute the laminated core and are produced in a punching manner.
Figure 5:
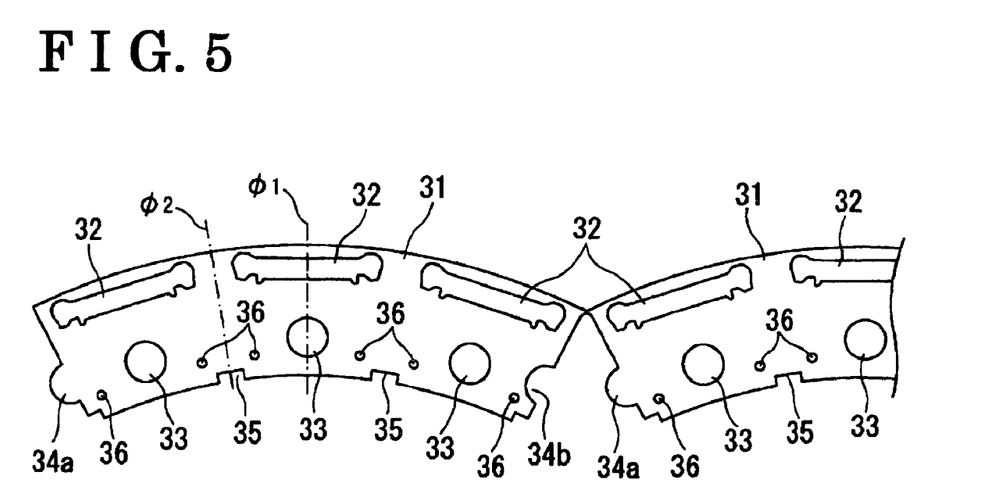
FIG. 5 is an enlarged front view of the arc-shaped unit cores illustrated in FIG. 4.

FIG. 1 is a cross-sectional view of an electric motor for which a laminated core of a rotor is used. FIG. 2 is a cross-sectional view of the rotor illustrated in FIG. 1. FIG. 3 is a front view of the laminated core of the rotor employed in FIG. 2. FIG. 4 is a front view of arc-shaped unit cores that constitute the laminated core and are produced in a punching manner. FIG. 5 is an enlarged front view of the arc-shaped unit cores illustrated in FIG. 4.

According to the present embodiment, the laminated core of the rotor is used in an electric motor 1. However, an electric generator can be used instead of the electric motor. As shown in FIG. 1, the electric motor 1 includes a stator 10, and a rotor 20 arranged inside of the stator 10. The stator 10 is constituted in such a manner that the stator core 12 and the stator coil 13 are mounted onto a stator mounting frame 11. A control circuit 14 for controlling a rotation of the electric motor 1 is also attached to the stator mounting frame 11. According to the present embodiment, the stator core 12 and the stator coil 13 are assembled onto the stator mounting frame 11 by means of multiple mounting bolts 15. The aforementioned structure of the stator 10 of the electric motor 1 is a known structure.

As shown in FIG. 2, the rotor 20 is constituted by a laminated core 30 mounted onto a rotor holding frame 21. As shown in FIG. 3, the laminated core 30 includes multiple arc-shaped unit cores 31, which make closely contact with one another by means of end plates 23*a* and 23*b* that hold the laminated core 30 at axially both ends thereof. The laminated core 30 is integrally fixed to the rotor holding frame 21 by means of multiple mounting bolts 24 that bring the end plate 23*b* to be fixed to the rotor holding frame 21. The arc-shaped unit cores 31 are pressed in an axial direction by means of projections 36 arranged along a circumferential direction of the unit cores 31 while a laminating process, so as to be integrated before the arc-shaped unit cores 31 are sandwiched by the end plates 23*a* and 23*b*.

After the laminating process, permanent magnets 28 are inserted into permanent magnet fitting bores 32, respectively. That is, according to the present embodiment, the permanent magnet is used for the magnetic pole in a sate in which a magnetic attractive force between the permanent magnets 28 and the stator 10 is greater than that between a portion defined between the adjacent permanent magnets 28 and the stator 10. Since the sleeves 22 are inserted into the through-holes 33 of the unit cores 31 respectively in addition to the end plates 23*a* and 23*b* for closely contacting the arc-shaped unit cores 31 with each other, and end portions of the sleeves 22 are riveted, the rotor 20 is able to endure a centrifugal force generated and applied along with the rotation of the rotor 20. Then, a center bore 21*b* is defined in a center of the rotor holding frame 21. Multiple fitting bores 21*a* are also defined around the center bore 21*b* and fixed to an output shaft 25 by means of mounting bolts 26 as shown in FIG. 1.

The laminated core 30 will be explained in detail below. According to the present embodiment, the laminated core 30 has 'n' number (a first number) of magnetic poles, n being a natural number divided by two, arranged on an entire circumference. FIG. 3 is an example that shows that the laminated core 30 has twenty poles. According to the present embodiment, each arc-shaped unit core 31 has three magnetic poles. The unit core 31 normally has 'm' number (a second number) of magnetic poles, m being a natural number except for an aliquot part of the 'n'. As shown in FIG. 4, the arc-shaped unit cores 31 are formed in series by punching a strip of steel plate such as silicon steel plate. Thus, the lesser number of magnetic poles of the unit core 31 can decrease a width W of the strip of steel plate.

The arc-shaped unit cores 31 adjacent to each other, i.e. next to each other, in the circumferential direction are connected to each other through a contact portion having a width of approximately 0.5 to 5 mm. The width of the contact portion is determined on the basis of a thickness t mm of the unit core 31, the number of magnetic poles m, a diameter of the rotor 20, and the like, and mostly set to approximately 1 to 3 mm. Further, a protruding portion 34*a* and a recess portion 34*b* are formed respectively on one end and the other end of each unit core 31. According to the present embodiment, the protruding portion 34*a* and the recess portion 34*b* each have a semicircular shape. Alternatively, in order to achieve the present embodiment, a tapered shape such as a triangle is applicable to the protruding portion 34*a* and the recess portion 34*b* to thereby achieve the adjacent unit cores 31 to be naturally integrated when the adjacent unit cores 31 are bent at the contact portion to be wound and laminated. Because of the shape of the protruding portion 34*a* and the recess portion 34*b*, the magnetic resistance of magnetic path formed between the permanent magnets 28, the adjacent unit cores 31, and the like can be reduced.

Each arc-shaped unit core 31 includes the 'm' number of permanent magnet fitting bores 32 corresponding to the number of magnetic poles. Each through-hole 33 into which the sleeve 22 is inserted is formed on a line connecting a center of each permanent magnet fitting bore 32 in the circumferential direction to a center of the arc of the unit core 31, i.e. the line shown by φ1 in FIG. 5. At the same time, the through-hole 33 is formed distant from the permanent magnet fitting bore 32 and where a mechanical strength can be obtained.

Then, notched recess portions 35 are formed on each arc-shaped unit core 31, being positioned on a side opposite to the stator 10. The notched recess portion 35 is used, during the laminating process, for bringing the unit cores 31, which are arranged in series, to be wound in a spiral manner and for sequentially assembling the unit cores 31. The notched recess portions 35*a* are formed in positions where the strength around each through-hole 33 that receives the centrifugal force generated along with the rotation of the rotor 20 is not influenced, i.e., on a line connecting a center of adjacent through-holes 33 to the center of the arc of the unit core, i.e. the line shown by φ2 in FIG. 5.

The arc-shaped unit cores 31 formed in series and having the aforementioned structure are assembled as follows. First, a start portion of the unit core 31 from which winding is started is fixed by means of a magnet and the like to one end of a cage-shaped rotary frame (not shown) that engages with the notched recess portions 35. At this time, an axial lamination amount X, i.e. an amount of laminations in the axial direction of the unit cores 31 is defined as follows: X=θ*t/360, where θ is a winding angle of the unit cores and t is a thickness of each unit core 31. For example, if the thickness of the unit core 31 is 2 mm and the unit cores 31 are wound and laminated two times, the winding angle θ is 720° and thus the axial lamination amount X is 4 mm.

When the unit cores 31 are wound and laminated a predetermined number of times in a circumferential direction into a spiral shape, i.e., when the unit cores 31 are wound and laminated while the cage-shaped rotary frame that engages with the notched recess portions 35 is brought to rotate in a rightward direction, unit cores 31*a* to 31*g*, for example, as shown in FIG. 3, are sequentially arranged so as to be wound in the spiral manner. When the first lamination of the unit cores 31 is obtained as shown in FIG. 3, a third of the size of the unit core 31*g* overlaps with the unit core 31*a*. That is, a phase shifting occurs in the circumferential direction among laminations of the laminated core 30. More precisely, contacting faces between the adjacent unit cores 31 are arranged in a staggered manner in the circumferential direction among the laminations so that the staggeringly laminated rotor core is constituted.

This is because the laminated core 30 has the 'n' poles, n being a natural number divided by two, while each unit core 31 has the 'm' poles, m being a natural number except for an aliquot part of n. When the axial lamination amount X of the unit cores 31 reaches a predetermined value, the lamination process is completed. An end portion of the unit cores 31 where winding ends can be arranged, in view of an entire balance, in such a manner that the end portion is in alignment with the start portion of the unit core 31a in the axial direction.

The laminated core 30 having the aforementioned structure is pressed and integrated by means of the projections 36 formed along the entire circumference of the laminated core 30 while the laminating process is performed. Then, the laminated core 30 is sandwiched by the end plates 23a and 23b. The sleeves 22 are inserted into the respective through-holes 33 and end portions of which are riveted, thereby realizing the rotor 20 that can endure the centrifugal force generated and applied along the rotation of the rotor 20. The end plate 23b is integrally fixed to the rotor holding frame 21 by means of the multiple mounting bolts 24. The laminated core 30 assembled in the aforementioned manner is fixed, as the mounting bolts 26 are inserted into the multiple fitting bores 21a, to the output shaft 25 rotatably supported by the stator mounting frame 11.

According to the aforementioned embodiment, the adjacent unit cores 31 are connected to each other through a part of the outer circumference. Thus, the laminated core 30 can be consecutively formed by a series of unit cores 31. At this time, by means of the notched recess portions 35, the unit cores 31 arranged in series can be sequentially wound in the circumferential direction into a spiral shape. In addition, the projections 36 engaging with each other in the axial direction when the unit cores 31 are laminated can achieve precise positioning of the unit cores 31 and can be pressed for the purpose of maintaining the laminating state. Thus, a time for the laminating process can be decreased and the laminated core 30 having a high mechanical strength can be achieved.

Since the sleeves 22 are press-fitted and both ends of which are riveted so as to maintain the position of the unit cores 31 in the laminating direction, the unit cores 31 adjacent to each other in the laminating direction can endure the centrifugal force applied to the unit cores 31. Thus, the laminated core 30 having the high resistance against the centrifugal force can be obtained. Further, yield of material is excellent as compared to a case in which an integrated annular core is manufactured. Furthermore, the contacting faces between the adjacent unit cores 31 in the circumferential direction are arranged in the staggered manner among the laminations so as to obtain the staggeringly laminated rotor core. Thus, a magnetic flux may enter among the laminations to thereby prevent increase of magnetic resistance caused by segmentation of the core.

The axial lamination amount X of the unit cores 31 of the laminated core 30 is balanced among all magnetic poles. Thus, the displacement of the permanent magnet fitting bores 32, the through-holes 33, and the like, which may be caused by the laminating process when the unit cores 31 are manufactured by a single press die, can be minimized. Convenience in assembling the permanent magnets 28, the sleeves 22, and the like, and the target functions of the laminated core 30 can be achieved. Further, the pressing of the laminated core 30 in the laminating direction is possible and thus productivity thereof may be enhanced.

Furthermore, the unit cores 31 are connected to each other on the outer circumferential side as shown in FIG. 4. Thus, after the unit cores 31 are manufactured by the press die, the unit cores 31 can be wound in the spiral manner by a winding jig, thereby achieving consecutive winding and lamination. As a result, the laminated core 30 can be formed for a short time as compared to a case in which separate unit cores are arranged.

The adjacent unit cores 31 in the circumferential direction are connected to each other through a part of the outer circumference, i.e. the contacting portion that normally has the width of 0.5 to 5.0 mm. In addition, the protruding portion 34a and the recess portion 34b are formed on both ends of each unit core 31. The protruding portion 34a and the recess portion 34b may be tapered so as to be easily mated to each other. The through-hole 33 formed on the unit core 31 and through which the sleeve 22 is inserted may be positioned in a certain place so that the magnetic path and the strength of centrifugal force resistance of the unit cores 31 are not influenced. In addition, the notched recess portion 35 may be positioned in a certain place so that the magnetic path and the strength of centrifugal force resistance of the unit cores 31 are not influenced.

Further, the projections 36 pressed so as to maintain the laminating state of the unit cores 31 are formed in the vicinity of the notched recess portions 35. Each projection 36 may be positioned in a certain place so that the magnetic path and the strength of centrifugal force resistance of the unit cores 31 are not influenced.

According to the aforementioned embodiment, a case in which the rotor 20 of an inner rotor type of the electric motor 1 has been explained. However, the present embodiment can be employed when the rotor of an outer rotor type or the stator 10 of the electric motor 1 is manufactured. In this case, the permanent magnet fitting bores 32, the through-holes 33, the notched recess portions 35, and the projections 36 are positioned on the inner circumferential side instead of the outer circumferential side.

Further, according to the aforementioned embodiment, segmentation portions of the core are arranged in the staggered manner in the circumferential direction among the laminations only by winding the unit cores 31, thereby obtaining the staggered lamination. The staggeringly laminated core can be manufactured in a short time accordingly. In addition, a low cost motor can be obtained due to increase of material yield as compared to the integrated annular core. The laminated core 30 having the high resistance of centrifugal force can be obtained by a position holding mechanism among the unit cores 31.

Furthermore, since the arc-shaped unit cores 31 connected to each other through a part of the circumference are wound and laminated, a time for winding and forming the lamination can be reduced as compared to a case in which the unit cores are separate from each other. Then, since the protruding portion 34a and the recess portion 34b are formed on the both ends of the unit core 31 respectively, the size of faces of the adjacent unit cores 31 to make contact with each other when the unit cores 31 are wound into the spiral shape can increase, thereby causing decrease of the magnetic resistance and reduction of adverse influence in view of output performance of segmentation of unit cores 31.

Furthermore, the laminated core 30 is constituted in such a manner that the sleeves 22 are inserted into the through-holes 33 respectively and both ends of which are riveted for the purposes of retaining the position of the unit cores 31 in the laminating direction. In order to minimize influence to the motor performance, each through-holes 33 can be positioned in a place with less magnetic flux. In addition, at that time, the through-holes 33, the notched recess portions 35, and the projections 36 are prevented from interfering with each other.

Furthermore, according to the aforementioned embodiment, one of the multiple unit cores has M number (third number) of magnetic poles, M being a natural number smaller than the 'm'. In the present embodiment, the start portion and the end portion of the unit cores 31 for being wound in the spiral manner are possible to be misaligned in the circumferential direction. In this case, only one of the multiple unit cores 31 may have lesser magnet poles than the rest of the unit cores 31 for preventing misalignment of the start portion and the end portion. The M number of magnetic poles of one of the unit cores 31 is defined so that the start portion and the end portion for winding of the unit cores 31 are axially aligned.

Furthermore, according to the aforementioned embodiment, the through-hole 33 is arranged on the substantially center line of the permanent magnets 28 in the circumferential direction. The position on the center line mentioned above has small magnetic flux since the magnetic path that the permanent magnet forms is divided into right and left sides.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A laminated core having a first number of magnetic poles, the first number being a natural number divisible by two, of a rotary electric machine, comprising:
a plurality of arc-shaped unit cores each having a second number of magnetic poles, the second number being a natural number except for an aliquot part of the first number;
the unit cores being wound and laminated a predetermined number of times in a circumferential direction into a spiral shape in such a manner that an axial lamination amount of the unit cores is obtained by an equation of $X=\theta*t/360$, X being the axial lamination amount, $\theta$ being a winding angle of the unit cores, and t being a thickness of the unit core; and
the unit cores adjacent to each other in the circumferential direction connected to each other at a part of an outer circumference thereof.

2. A laminated core of a rotary electric machine according to claim 1, wherein the unit cores include a start portion and an end portion for being wound and laminated, a unit of the start portion or an unit of the end portion having a third number of magnetic poles, the third number being a natural number smaller than the second number.

3. A laminated core of a rotary electric machine according to claim 1, wherein each of the unit cores includes a protruding portion and a recess portion at ends respectively, the protruding portion and the recess portion being mated to each other when the unit cores are wound and laminated.

4. A laminated core of a rotary electric machine according to claim 1, wherein the unit cores include through-holes into which sleeves are inserted respectively.

5. A laminated core of a rotary electric machine according to claim 1, wherein the unit cores include notched recess portions by means of which the unit cores are wound in the circumferential direction.

6. A laminated core of a rotary electric machine according to claim 5, wherein the unit cores include projections around the notched recess portions for maintaining a laminating state of the unit cores.

7. A laminated core of a rotary electric machine according to claim 5, wherein the notched recess portion is formed in a substantially center portion between the adjacent through-holes in the circumferential direction.

8. A laminated core of a rotary electric machine according to claim 4, wherein the through-hole is arranged on a substantially center line of a permanent magnet in the circumferential direction when the permanent magnet is used for the magnetic pole in a state in which a magnetic attractive force between the permanent magnets and a stator is greater than the magnetic attractive force between a portion defined between the adjacent permanent magnets and the stator.

9. A rotary electric machine comprising the laminated core according to claim 1.

10. A rotary electric machine according to claim 9, wherein the unit cores include a start portion and an end portion for being wound and laminated, a unit of the start portion or an unit of the end portion having a third number of magnetic poles, the third number being a natural number smaller than the second number.

11. A rotary electric machine according to claim 9, wherein each of the unit cores includes a protruding portion and a recess portion at ends respectively, the protruding portion and the recess portion being mated to each other when the unit cores are wound and laminated.

12. A rotary electric machine according to claim 9, wherein the unit cores include through-holes into which sleeves are inserted respectively.

13. A rotary electric machine according to claim 9, wherein the unit cores include notched recess portions by means of which the unit cores are wound in the circumferential direction.

14. A rotary electric machine according to claim 13, wherein the unit cores include projections around the notched recess portions for maintaining a laminating state of the unit cores.

15. A rotary electric machine according to claim 13, wherein the notched recess portion is formed in a substantially center portion between the adjacent through-holes in the circumferential direction.

16. A rotary electric machine according to claim 12, wherein the through-hole is arranged on a substantially center line of a permanent magnet in the circumferential direction when the permanent magnet is used for the magnetic pole in a state in which a magnetic attractive force between the permanent magnets and a stator is greater than the magnetic attractive force between a portion defined between the adjacent permanent magnets and the stator.

17. A laminated core having a first number of magnetic poles, the first number being a natural number divisible by two, of a rotary electric machine, comprising:
a plurality of arc-shaped unit cores each having a second number of magnetic poles, the second number being a natural number except for an aliquot part of the first number;
the unit cores being wound and laminated a predetermined number of times in a circumferential direction into a spiral shape in such a manner that an axial lamination amount of the unit cores is obtained by an equation of $X=\theta*t/360$, X being the axial lamination amount, $\theta$ being a winding angle of the unit cores, and t being a thickness of the unit core; and the unit cores including through-holes into which sleeves are inserted respectively.

18. A rotary electric machine comprising the laminated core according to claim 17.

19. A laminated core having a first number of magnetic poles, the first number being a natural number divisible by two, of a rotary electric machine, comprising:

a plurality of unit cores each having a second number of magnetic poles, the second number being a natural number except for all aliquot parts of the first number;

the unit cores being wound and laminated a predetermined number of times; and the unit cores adjacent to each other connected to each other.

20. A laminated core of a rotary electric machine according to claim 19, wherein a phase shifting occurs in the circumferential direction among laminations of the laminated core.

21. A laminated core having a first number of magnetic poles, the first number being a natural number divisible by two, of a rotary electric machine, comprising:

a plurality of unit cores each having a second number of magnetic poles, the second number being a natural number except for all aliquot parts of the first number;

the unit cores being wound and laminated a predetermined number of times;

the unit cores adjacent to each other connected to each other; and the unit core of a first lamination only partly overlapping the unit core of a second lamination by a part having the magnetic pole.

* * * * *